United States Patent [19]

Chason

[11] 4,357,514
[45] Nov. 2, 1982

[54] WELDING METHOD AND APPARATUS

[75] Inventor: Kenneth R. Chason, Hadley, Pa.

[73] Assignee: GTI Corporation, Hadley, Pa.

[21] Appl. No.: 257,914

[22] Filed: Apr. 27, 1981

Related U.S. Application Data

[62] Division of Ser. No. 160,582, Jun. 18, 1980, Pat. No. 4,319,118.

[51] Int. Cl.³ .............................................. B23K 9/10
[52] U.S. Cl. .................................. 219/56.1; 219/103; 219/113
[58] Field of Search .................. 219/56.1, 103, 113

[56] References Cited

U.S. PATENT DOCUMENTS

| | | | |
|---|---|---|---|
| 2,339,884 | 1/1944 | Schlumpf | 219/103 |
| 2,537,989 | 1/1951 | Graham | 219/103 |
| 2,644,069 | 6/1953 | Pityo | 219/103 |
| 2,871,337 | 1/1959 | Johnson et al. | 219/113 |
| 2,894,113 | 7/1959 | Wakeley | 219/113 |
| 3,487,188 | 12/1969 | Draving | 219/113 |

Primary Examiner—C. C. Shaw
Attorney, Agent, or Firm—Webb, Burden, Robinson & Webb

[57] ABSTRACT

This application relates to a method and apparatus for welding together small oxide coated components by driving a sharp edge or point of one part into a face of another part and then discharging electrical energy, for example, a capacitively stored electrical current through the joint. Precision micrometer control of the distance one part accelerates toward the other along with continuously adjustable spring tension are used to program the inelastic collision of the two parts. The electrical discharge circuit is controlled to provide a controlled arc after collision.

1 Claim, 4 Drawing Figures

WELDING METHOD AND APPARATUS

RELATED CASE

This application is a division of application Ser. No. 160,582, filed June 18, 1980, now U.S. Pat. No. 4,319,118.

BACKGROUND

This invention relates to welding small oxide coated components together, for example, welding wires, ribbon, studs, pellets and wafers of the same or different oxide coated metal.

Two processes have developed over the years for welding small parts together. In alternating current resistance welding, the parts are pressed together and an alternating electrical current is applied across the joint. The alternating electrical current heats the parts and especially the joint and smaller part, say wire, until the two parts fuse together. In this process, sparking and/or arcing is observed when the alternating electrical current is applied. An example of apparatus for carrying out the resistance welding process is shown in Pityo U.S. Pat. No. 2,644,069. In this prior art patent, it is taught that as soon as the two parts abut a switch is closed either automatically or manually. Stepped up alternating current is then applied across the joint for a period of time which is adjustable and controlled by a suitable timer. When the timer times out the alternating current is interrupted and the welded part removed. This process is relatively slower than the percussive welding process next to be described. It is useful with metals that are easily ignited and in fact was the only process that could practically be used for welding tantalum wire to tantalum studs. Unfortunately, the time period for welding tantalum wire to tantalum studs using resistance welding is long due to the high resistance oxide coating that immediately forms on tantalum exposed to the air. The high resistance so restricts the alternating electrical current that it is only possible to weld parts at a rate of about one every two or three seconds. Even at this rate, the welds are not sufficiently reliable.

In the so-called percussive welding process, the mechanical apparatus is similar to that used for alternating resistance welding except the parts are driven together faster and with greater force. The electrical circuitry differs substantially. In this process, a charged capacitor is connected across the wire and stud, for example, before the parts are driven together. First a spark and then an arc are generated while the pieces are driven together. The spark is obtained by either first striking the two parts and then through an appropriate mechanism separating them to enable an arc to flow or by ionizing the space between the parts prior to contact. Initially, the wire may melt back away from the joint faster than it is being driven into the other part. This may be the mechanism for separating the parts when the arc is initiated by striking of the parts. The welded joint may be characterized by a weld fillet tapering away from the wire to the stud surface. There may be a certain amount of splashing and spattering of molten metal back over the pellet and wire. An electrical circuit for percussion (arc) welding is illustrated in Frank U.S. Pat. No. 2,755,365 in which a very high frequency signal is imposed on the circuit to aid in initiating the spark and then arc. Frank teaches that the prior art relied upon the proximity of the two parts to time the initiation of the arc. By use of a high frequency signal arc initiation can be better controlled independent of the position of the parts. Frank suggests that the factors affecting the success of the percussion (arc) welding process are (1) the timing between the mechanical and electrical phases, (2) the intensity of the discharge, (3) the duration of the arc, and (4) the amounts of percussive force. Frank teaches that it is desirable with the percussion welding process to start the arc soon enough, that is, while the parts are sufficiently spaced as the arc is necessarily extinguished on contact. Moreover, Frank teaches that it is desirable to maintain the arc until contact. Otherwise, it is taught, a good weld is not achieved. Frank teaches the arc may exist from 100 to 500 microseconds. The teachings of the Phillips et al. U.S. Pat. No. 3,654,423 are much the same as those of Frank. It is taught to use a high frequency signal to initiate the arc and that the arc discharges capacitors charge to 1600 volts. Phillips et al. claim to provide exact control over the (1) arc energy, (2) arc duration, and (3) the timing of triggering of the arc. Phillips et al. teach that the total amount of energy stored in the capacitors is adjusted to be substantially discharged and converted to thermal energy by the arc prior to the time the two parts contact. Reutschi U.S. Pat. No. 3,505,494 teaches drawing out the burning time of the arc by drawing the two parts together with apparatus that allows the arc itself to hold the two parts separate until the arc is extinguished. Peterson U.S. Pat. No. 3,433,921 teaches that at least 50% of the energy initially stored on the capacitor should be dissipated in the arc during the burn back interval.

As will become apparent, the applicants' process is neither an alternating electrical current resistance welding process nor a percussion (arc) welding process wherein the arc commences prior to collision or contact. The applicants' process involves the discharge of capacitively stored energy through the joint of the two parts being welded but with every attempt to minimize the intensity of the arc. Whereas the weld characterized by the percussion (arc) process described in the prior art patents is a fillet or skirt surrounding the wire part, no such fillet is produced by the applicants' process. The absence of the fillet is evidence of a different physical mechanism of welding. Moreover, photomicrographs of sections of welds according to this invention illustrate the wire part actually penetrates the other part, the degree depending on the hardness of the materials.

The very property of certain metals such as aluminum, magnesium and tantalum that makes them easily ignited by a hot arc (thus not suitably and safely welded by the percussion (arc) process) makes them develop an electrical resistive oxide coating (thus making it difficult to weld them with the alternating electrical current resistance welding process). Applicants do not wish to be tied to any particular theory explaining the success of the process and apparatus described herein to provide excellent welds with these difficult materials. However, it appears that just after the instance of touching, the oxide layer is sufficiently disrupted by the mechanical collision and/or the electrical field and arcing, such that rapid discharge of the stored electrical energy takes place very near the surface and possibly surrounded by a protective oxide plasma. Electrical arc and resistance heating raises the temperature of the parts especially a wire and the joint enabling a fusion of the two together without the large fillet characterizing some arc welds. Another aspect of the mechanism of welding according to this process is the minimization of burn back prior to contact coupled with the shaping of one part to a point and driving of the point into the other part enabling a wire, for example, to first contact and then slowly burn back allowing the arc to be maintained long enough to fuse the surface of the other part such that the wire can penetrate deep into a pellet, for example, during the discharge of the electrical welding energy.

One costly and difficult step in the fabrication of tantalum capacitors has been the attachment of the porous tantalum anode pellet to a solid tantalum lead wire. In many cases, this attachment has been made by molding and heating tantalum powder around the solid wire. Attempts to produce a more reliable electrical and mechanical connection between the anode and the lead wire have led to the use of manual control of resistance welding methods. Though that has been reasonably successful, a machine capable of high production rates has never been developed. The welder described herein can easily make an eight-to-one productivity improvement over manually operated machines currently used for the welding of tantalum capacitor anodes. Moreover, the applicant is unaware of even claims to weld aluminum wires by any process. Both tantalum and aluminum wire can be rapid welded according to this invention. For example, it is now possible to weld tantalum wire to sponge tantalum pellets at a rate of 12,000 welds per hour.

SUMMARY OF THE INVENTION

Briefly according to this invention, there is provided a method of welding one oxide coated element, say a length of wire, to another oxide coated element, say a pellet or disc. The first step comprises cutting one element, say the wire to have a sharp edge or point. A wire cut on an angle to its elongate axis will have to have a satisfactorily sharp edge. The angle is critical: If the edge is too sharp, arcing will be too severe blowing away the tip of the wire. If it is not sharp enough, the wire will not burn back and the energy will not be discharged in an arc but throughout the discharge circuit resulting in no weld or a bad weld. In the next step, the sharp edge of the one element is then driven into the surface or face of the other element. The driving force is programmed to disrupt an oxide layer on the surface of the parts. The next step comprises discharging stored electrical energy through the joint formed by the collision of the two parts to heat the joint and fuse the joint. In this step, the electrical energy is controlled to control the arcing after collision and during burn back.

According to a preferred method embodiment, tantalum, aluminum, molybdenum or other easily oxidized and ignited parts are welded. In yet another preferred method, tantalum wire lengths are welded to sponge tantalum anodes to provide subassemblies useful in the manufacture of tantalum capacitors. The first step of these preferred methods comprises cutting a tantalum wire length to have a sharp edge or point. The tantalum wire is dereeled, straightened, and clamped being guided by carbide bushings that will not contaminate the wire. Sponge tantalum pellets, discs or other anode shapes are gravity and clean-air fed to a clamping position from a staging bowl made of materials that will not contaminate the pellets. Natural lubricants are prevented from contacting the pellets or wire. In the next step, the sharpened edge of the tantalum wire is driven into the surface of the sponge tantalum pellet. The extent of the inelastic collision is controlled by adjusting the length of the tantalum wire and/or the driving force for driving the wire into the pellet surface. The mechanical action of the collision and the electrical arcing, just after the collision disrupt the durable oxide surface formed on the wire and pellet (the oxide coating forms so rapidly that it will exist on the freshly cut end of the surface of the wire). The next step comprises discharging capacitively stored electrical energy through the wire and pellet to fuse the joint together. The discharge must be timed to control the arc so that a flash will not ignite the tantalum wire or sponge tantalum anode.

According to this invention, there is also provided apparatus for welding very small oxide coated parts, say a wire and a pellet or disc together. The apparatus comprises devices for feeding, measuring and cutting one part and clamping it. The apparatus further comprises devices for feeding and clamping the other part. The apparatus comprises devices for driving a sharp point or edge of one part into the other. Finally, the apparatus comprises an electrical circuit for discharging stored energy in a manner to control arcing after started upon impact or collision. The electrical circuit releases the energy for heating the joint such that the sharp edge of one part actually penetrates the other.

In a preferred embodiment of this invention, there is provided apparatus for welding a wire length to a pellet or disc or otherwise shaped stud. The apparatus comprises devices for dereeling the wire, straightening the wire, measuring a length of the wire and cutting and clamping the length. The cut is made at an angle to the axis of the wire. The apparatus further comprises devices for feeding and clamping the pellet, disc or other shape. The apparatus is further provided with devices for driving the edge of the wire into the surface of the pellet with sufficient force to disrupt the oxide layers on the wire and pellet. Typically the apparatus for driving the edge of the wire into the surface of the pellet comprises a spring loaded apparatus for clamping either the wire or the pellet and a device to rapidly release the loaded spring so that it can drive the wire and pellet together. Preferably, the amount of tension on the spring is adjustable. The wire length may be very crucial and therefore the apparatus for measuring and cutting the wire includes a micrometer for precise adjustment of the cut wire length. The apparatus further comprises a circuit that charges capacitors and then discharges the capacitively stored energy through a circuit including the wire and the pellet. The charging portion of the circuit is provided with a variac (an auto transformer with an adjustable tap providing a continuous alternating output voltage varying from zero to somewhat more than the input voltage) connected through a mechanically activated switch to a rectifier (for example, a full wave diode rectifier). The direct current output of the rectifier is applied to a capacitor or bank of capacitors. Preferably a plurality of capacitors can be individually or simultaneously connected to receive the output of the full wave rectifier by relay switches. Thus a plurality of selectable capacitances and a voltage continuously variable between zero and some upper limit may be set to provide the amount of electrical energy to be discharged through the circuit including the two parts to be welded. These settings will also affect the rate of discharge. The capacitors are connected in a discharge circuit in series with the parts to be welded. Also in the discharge circuit is a mechanically actuated switch and a resistance element for further controlling the rate of discharge. The mechanically actuated switches (usually cam actuated) are actuated so that the switch in the charging portion of the circuit is opened prior to the time two parts to be welded are driven together. This switch must close subsequently to the discharge of the capacitors to permit recharging. The switch in the charging portion of the circuit should be on the alternating current side of the rectifiers to minimize switch arcing. The switch in the discharge side of the circuit is actuated to close after a new wire and pellet have been clamped and moved away from the respective feeding devices and prior to the time the two parts to be welded are driven together. This switch must be opened after the capacitors are substantially discharged to allow recharging. At the time the switch is opened, the voltage across the capacitors is low and the tendency for switch arcing is minimized.

An important aspect of this invention is controlling the application of electrical energy to the joint between the wire and other part. This can be achieved in several ways. For the purposes of this invention, it has been found desirable to add a resistance in series with the discharging capacitor and the weld joint to slow down the discharge. Since the resistor dissipates energy itself in order to obtain sufficient heating energy for the weld joint, it may be necessary to increase the energy stored on the capacitor prior to discharge. Thus, if the resistor doubles the resistance in the discharge circuit (ignoring for the moment that the resistance in the discharge circuit is constantly changing), the energy stored on the capacitor can be increased times two either by doubling the capacitance and leaving the voltage the same, or by increasing the voltage times the square foot of two. The former is much more effective in slowing the discharge through the weld joint. Either way the energy for welding the joint is delivered more slowly. It is also possible to slow down the discharge without putting a resistor in series with the capacitor and weld joint. For example, doubling the capacitance and reducing the voltage by dividing by the square root of two will have the same effect as the case of doubling the resistance and increasing the voltage by the square root of two. Yet another approach is placing a small inductor in series with the capacitor and weld joint. This approach does not require that additional energy be stored upon the capacitor. With the inductor the discharge is inhibited for a period immediately after the discharge begins but the overall time of discharge is not much different than if no inductance is added. Moreover, a combination of the above approaches may be used to slow down the current passed into the joint just after contact.

THE DRAWINGS

Further features and other objects and advantages of this invention will become clearer from the following detailed description of preferred embodiments made with reference to the drawings in which FIG. 1 is a flow diagram illustrating the method steps and/or machine functions of this invention, FIG. 2 is a front view of a machine for performing the welding according to this invention, FIG. 3 is a preferred electrical circuit for providing the electrical energy for welding according to this invention, and FIG. 4 is a photomicrograph of a section of a weld of a tantalum wire to sponge tantalum anode made according to the methods of this invention and using the apparatus described herein.

DESCRIPTION OF THE PREFERRED EMBODIMENTS

Figure 1:
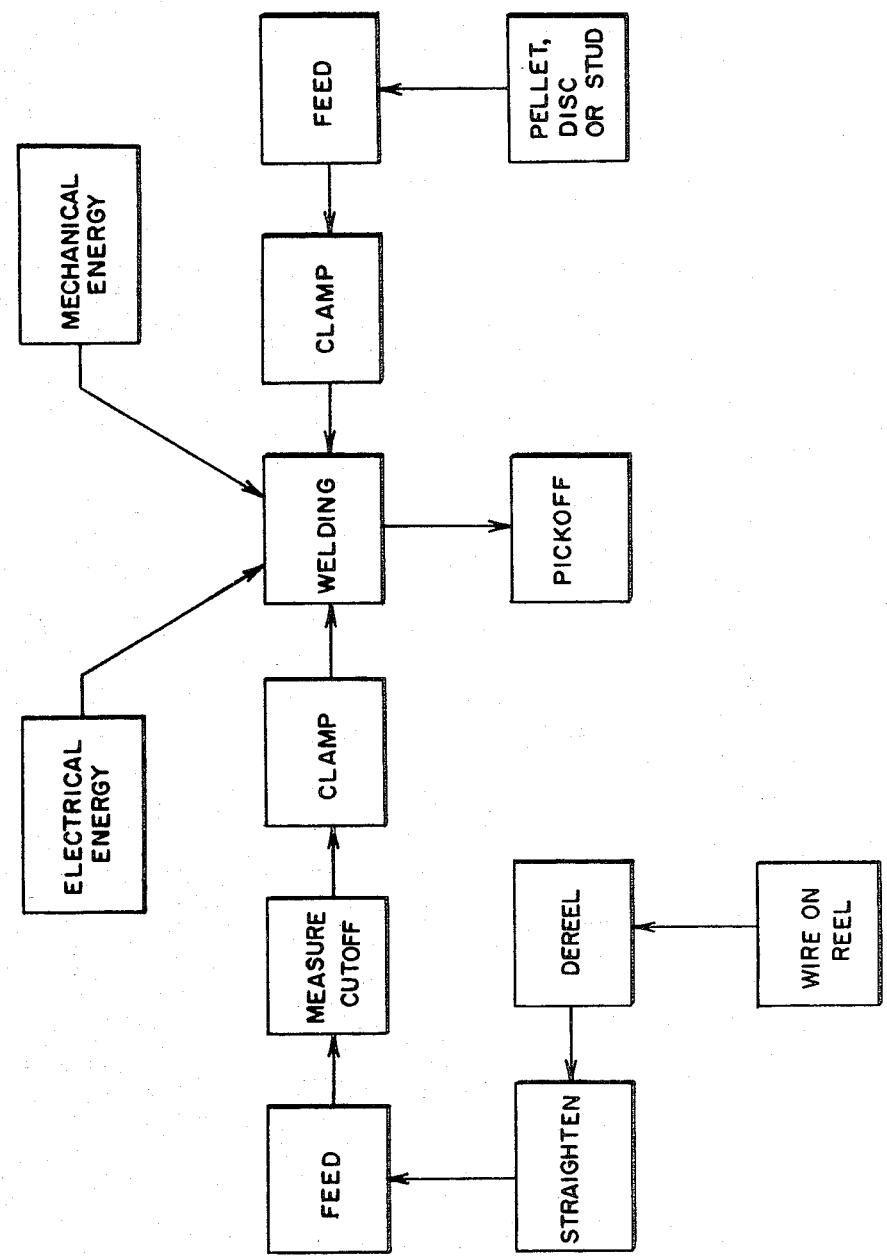

Referring now to FIG. 1, there is shown a flow diagram of process steps according to this invention or the functions of an apparatus according to this invention. Wire on a reel is dereeled, straightened, fed toward the welding position. On its way to the welding position, it is measured and cut and then clamped. From another direction, pellets, discs or studs are fed toward the welding station and clamped. At this point, stored mechanical energy drives the clamped wire length, and pellet, disc or stud together. Substantially simultaneously with the collision of the wire length and pellet, for example, electrical energy is discharged through the joint fusing the wire to the pellet. Thereafter the welded part is picked off and deposited in a welded part container. With the method and apparatus according to this invention, welded parts maybe produced at a rate of about three per second, which means that the repetitive operations take place within a time period of 300 milliseconds.

Figure 2:
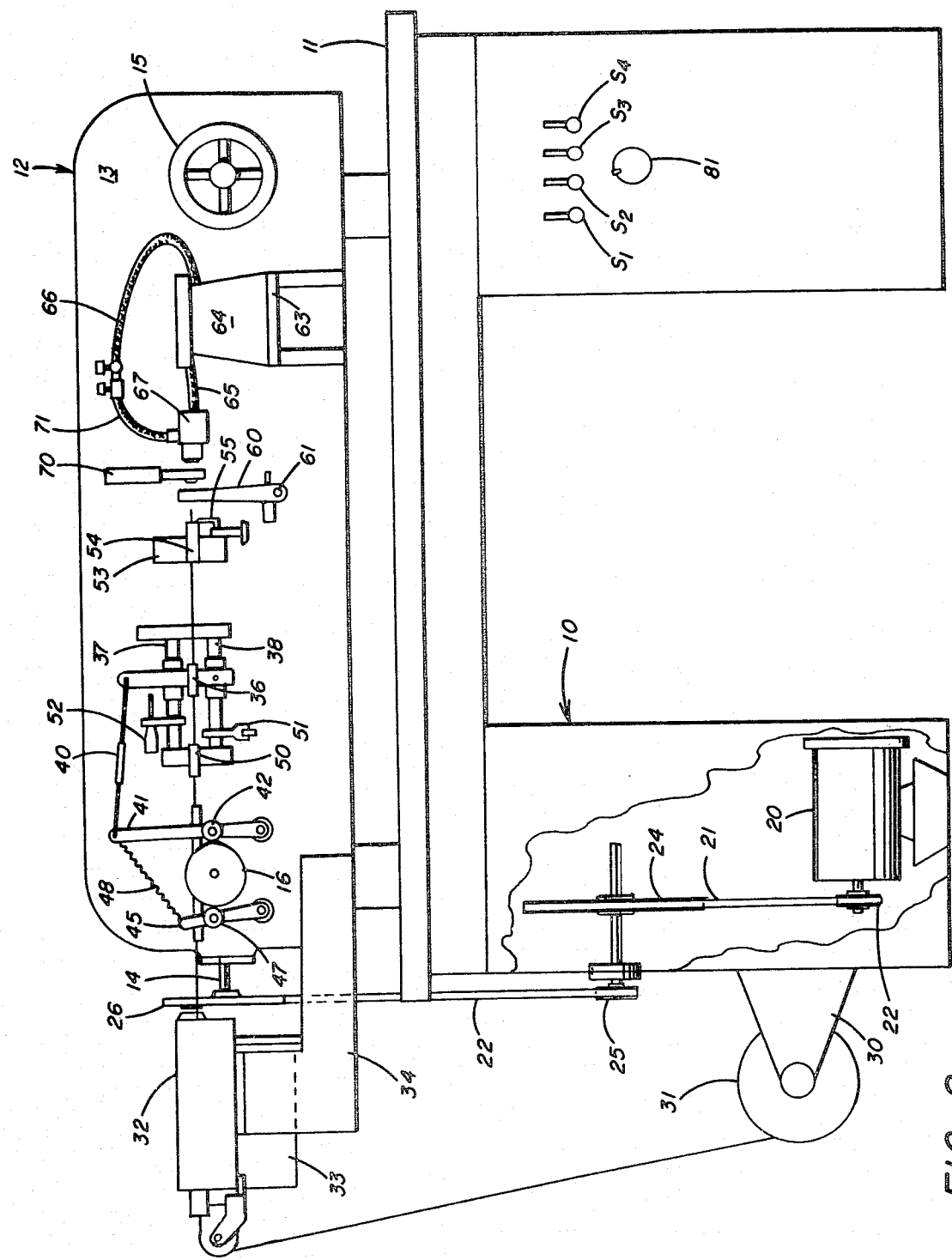

Referring now to FIG. 2, there is illustrated an apparatus (portions of which are similar to apparatus used for prior percussion (arc) welding and/or alternating current resistance welding) which is especially adapted for use in the practice of the invention disclosed herein. Suitable apparatus comprises a bench 10 supporting a benchtop 11. Setting upon the benchtop is a heavy ribbed casting 12 having a large vertical face 13. Directly behind the face, and not visible in FIG. 2, is a main shaft 14 journaled to be substantially parallel to the face 13 and the benchtop 11. The main shaft is provided with bevel gears, not shown, near each end. The one bevel gear connects the shaft of hand wheel 15 to the main shaft 14. The other bevel gear connects the shaft of the wire feeding cam 16 to the main shaft 14. The devices for feeding, cutting, clamping, and driving parts together are all mounted on the face 13 of the casting and are driven by levers that pass through openings in the face of the casting and are themselves actuated by cams turned directly or indirectly by the main shaft.

Below the bench top in the cabinet is located a motor 20 for driving the main shaft. The motor is driven through belts 21, 22, and sheaves 23, 24, 25, and 26. Mounted along the left side of the bench is a bracket 30 for supporting reel 31 from which the wire is played off.

Mounted to the left of the casting 12 is a wire straightener 32 which has its own high speed motor 33 associated therewith. The motor and straightener are supported from bracket 34 extending away from and secured by the casting 12.

The straightener 32 comprises a tensioner pulley over-which the wire is fed through a carbide bushing into a spinner section. The wire is guided out of the spinner section by another carbide bushing. The spinner section comprises rotating carbide projections extending across the rotation axis of the spinner. As the wire is pulled through the spinner, it is forced to define a series of conic surfaces, each smaller than the last.

Wire feeding and clamping is accomplished by a number of elements including a reciprocating wire guide and clamp 36 which is slidably mounted on guide shaft 37 and rotatable guide shaft 38. The guide shafts 37 and 38 are, of course, parallel. The reciprocating guide and clamp 36 is caused to reciprocate by adjustable length push rod 40. The push rod is secured to lever arm 41 pivotally connected to the face 13 of casting 12. A cam follower 42 rotatably mounted upon the lever 41 bears upon the wire feed cam 16. A retracting lever 45 is pivotally mounted on the face 13 of casting 12 and supports cam follower 47 which bears upon the wire cam feed 16. Lever 41, to which the push rod 40 is attached, and the retracting lever 45 are biased toward one another by spring 48. Rotation of cam 16 thus drives the movable wire guide and clamp in a reciprocating motion.

A fixed wire guide and clamp 50 is fixed relative to the guide shaft 37 and rotatable guide shaft 38. A lever 51 causes a periodic rocking of the rotatable guide shaft 38. Rocking of the rotatable guide shaft 38 actuates the clamping mechanisms of both the fixed guide and clamp 50 and the movable guide and clamp 36. The clamping action of fixed guide and clamp 50 is actuated when the reciprocating guide 36 is moving away from the welding position. The clamping action of the reciprocating guide and clamp 36 is when it is moving toward the welding position. A micrometer adjustment 52 restricts the movement away from the welding position of the movable wire guide and clamp 36, thus enabling the micrometer adjustment of the wire length.

A wire cutting mechanism 53 comprises a wire guide 54 with an axial wire passage end with a face defined by a plane intersecting the wire passage in the wire guide at an acute angle. A cutting knife 55 is arranged to slide back and forth over the face of the wire guide 54 by relative movement of the knife and wire guide actuated by cams driven from the main shaft 14.

A wire clamp and arm 60 comprises a lever pivotally mounted to the face 13 of the casting 12 at 61 having jaws for closing upon the wire just prior to the severing of the wire by the cutting mechanism 53. Angular motion of the arm 60 drives the wire toward the welding position. A spring biasing mechanism urges the arm 60 toward the welding position. Cams connected to the main drive shaft 14 move the wire clamping arm 60 against the bias and abruptly release the arm to permit it to fly toward the welding position.

A platform 63 is mounted on the front face 13 of the casting 12 and supports a pellet feeding bowl 64. The pellet feeding bowl by action of rotation and vibration aligns and feeds pellets through flexible conduit 65. The feeding bowl may be air driven through conduit 66. The pellets are delivered through the flexible conduit 65 to the feeder 67 by the action of gravity. The pellets are expelled one at a time from the feeder 67 into pellet clamp 70 by a blast of compressed air fed to the feeder 67 through conduit 71.

Thus wire is dereeled from reel 31 and pulled through straightener 32. The wire is then fed through fixed guide and clamp 50, and reciprocating guide and clamp 36. The clamping and unclamping of the guides and clamps 36 and 50 in synchronized with the reciprocal motion of the guide and clamp 36 to incrementally advance the wire through the wire cutting guide 54. After cutting a length of wire is clamped by movable wire clamping arm 60 which is poised for quick movement toward the welding position. A pellet is simultaneously clamped in clamp 70 for every wire length clamped in wire clamping arm 60.

The two parts to be welded are poised for the welding action. Not illustrated in FIG. 2 for purposes of not crowding the drawing is a pick-off mechanism for removing the welding part from the welding position to an awaiting receptacle.

In a cabinet on the right side of the bench is located a bank of switches $S_1$, $S_2$, $S_3$, and $S_4$ and a variac control dial 81. These switches allow adjustment of the electrical circuit next to be described.

Figure 3:
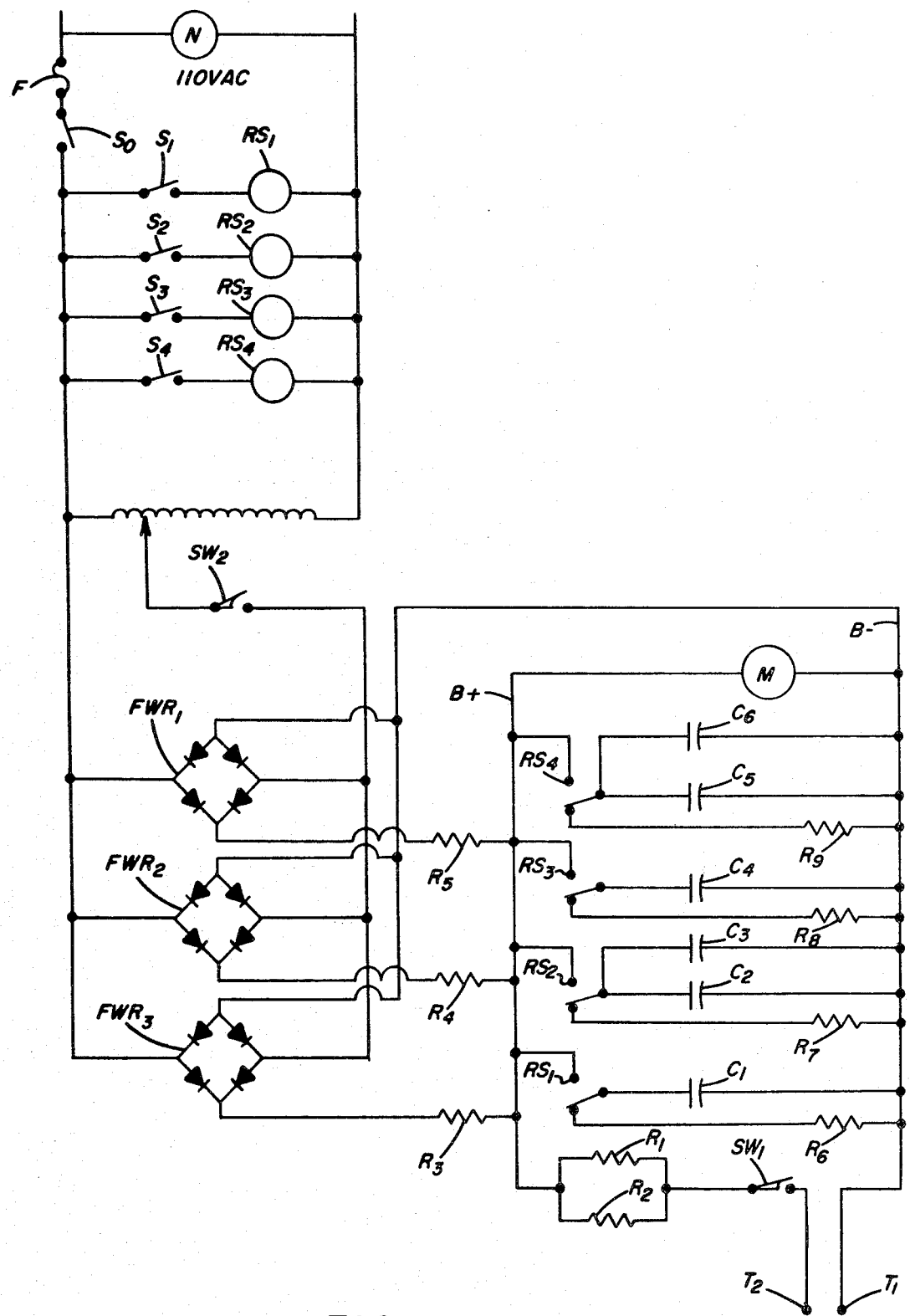

Referring now to FIG. 3, there is illustrated a preferred electrical circuit for supplying electrical energy to the weld. A 110 volt alternating current source is supplied through a fuse F and switch $S_0$ to a variac which is generally an auto transformer with a toroidal winding and a rotating carbon brush. The winding is tapped by the brush such that the winding acts as both the primary and secondary winding of the transformer. Typically, a variac provides a continuously variable output voltage from 0 to 117% of the line voltage. The output of the variac is supplied through switch $SW_2$ (a mechanically or cam actuated switch) to a bank of three full wave rectifiers $FWR_1$, $FWR_2$, $FWR_3$ connected in parallel. The outputs of the full wave rectifiers are connected through charging resistors $R_3$, $R_4$, and $R_5$ to an input-output bus $B+$. A plurality of capacitors $C_1$, $C_2$, $C_3$, $C_4$, $C_5$, and $C_6$ are arranged for parallel connection individually or in selectable groups to the input-output bus $B+$ through relay control switches $RS_1$, $RS_2$, $RS_3$, and $RS_4$. The pull-in coils of the relay switches are activated by manual switches $S_1$, $S_2$, $S_3$, and $S_4$. The relay switches are single throw, double pole switches enabling the capacitors $C_1$, $C_2$, $C_3$, $C_4$, $C_5$, and $C_6$ to be connected to bleed resistors $R_6$, $R_7$, $R_8$, and $R_9$ when the capacitors are not connected to the input-output bus $B+$. The negative side of the capacitors are each connected to the input-output bus $B-$ and the negative side of the full wave rectifiers. The positive bus $B+$ is connected through resistors $R_1$ and $R_2$ and mechanically actuated switch $SW_1$ to $T_2$ the positive output terminal. The negative bus $B-$ is connected to the negative output terminal $T_1$. The adjustment of the variac controls the direct current output voltage of the full wave rectifiers from 0 up to about 140 voltages. The capacitors $C_1$, $C_2$, $C_3$, $C_4$, $C_5$, and $C_6$ are selected so that the capacitance is selectable, for example, between about 100 and 2,000 microfarads. The resistors $R_1$ and $R_2$ may vary from about 2 to 10 ohm and should be extremely high wattage elements, for example, 250 watts have been found acceptable.

The following table sets forth the characteristics of a preferred embodiment of the circuit of FIG. 3.

| Type | Designation | Characteristics |
| --- | --- | --- |
| Resistor | $R_1$, $R_2$ | 5 ohm, 250 watt |
| Resistor | $R_3$, $R_4$, $R_5$ | 50 ohm, 200 watt |
| Resistor | $R_6$, $R_7$, $R_8$, $R_9$ | 1k ohm, 8 watt |
| Capacitor | $C_1$ | 1100 mfd, 350 vdc |
| Capacitor | $C_2$, $C_3$, $C_4$ | 220 mfd, 450 vdc |
| Capacitor | $C_5$, $C_6$ | 50 mfd, 450 vdc |

The above described apparatus is particularly useful for the welding of tantalum wire to sponge tantalum anodes. As used herein, pellets are defined as cylindrical parts having a diameter equal to or less than the length. A wafer is a cylindrical part the length of which is less than the diameter of rectangular or square with the thickness less than the shortest side. Sponge tantalum anodes are typically pellets and wafers. The tantalum anodes are molded from a very finely milled tantalum powder. The molded powder is sintered at high temperatures under vacuum leaving a porous structure having a high capacitance for unit volume. The sponge-like or porous structure permits the electrolyte in the capacitors with which the anode is used to penetrate the volume thereof, reaching the electrochemically formed oxide film which assures the surface area of nearly the entire tantalum mass to contribute to the capacitance. However, the large surface area makes the anode pellet or wafer especially vulnerable to burning if ignited.

The handling of the porous, sintered tantalum anodes is rather sensitive. Contamination of the tantalum's surface at this stage can lead to electrical failure after the capacitor has been fabricated. To avoid contaminating the anodes, which are formed as either pellets or wafers, the vibratory feed bowl is made of stainless steel and coated aluminum. The feed system is an air-assisted gravity feed system. In the case of pellets, the anodes are transferred through the feed system to the welding position with the aid of clean, dry, oil-free air provided, for example, by the machine's own air compressor. At the welding position, the anode pellet is carefully clamped in preparation for the welding operation. This clamp, though it must firmly hold the pellet, must leave the porous tantalum surface unmarred.

The solid tantalum lead wire, while more durable, must also be handled carefully at all stages to avoid damage to its surface. The wire is fed from a dereeler through a tensioner and a spin straightener to a clamping arm. At the clamping arm, the wire is cut off and moved into position near the welding station.

Next, the arm forces the solid tantalum wire into the porous tantalum anode pellet in a micrometer-controlled motion, adjustable by the operator, and the capacitor-stored electrical energy is rapidly discharged through the mating area of the two parts. Securely welded by the localized heat energy transient, the pellet and wire become a rigid single unit ready for removal from the welding station. A pick-off arm clamps onto the unit's lead wire, just before the release of the wire clamp and anode clamps, and moves in a forward arc to deposit the unit into a finished part container. This entire mechanical feed and welding operation requires less than 300 milliseconds per cycle at the rates of 12,000 assemblies or more per hour.

Essential to such high speed tantalum-to-tantalum welding is the close control of welding spark or arc and the maximum instantaneous temperature of the welded unit. If ignited, a porous tantalum anode will burn fiercely, and in all likelihood, set fire to the accumulated units in the finished part container. So, the ignition temperature of the porous, sintered tantalum anode must not be reached at any time. The sequence of the machine's welding cycle avoids that potential disaster.

The timing of the electrical discharge is controlled by the electrical power supply, which is controllable by the operator. The power supply is capable of storing up to 140 volts in capacitance of about 2000 microfarads, for example. The timing of the start of the discharge into the junction of the mated tantalum parts is initiated by the very close proximity or striking of the two parts which in turn is synchronized by a combination of cams. The expotential discharge rate is controlled, for example, by series resistors in the discharge path. The amount of energy discharged is controlled by the number of capacitors in the circuit, and the voltage set on the capacitors and set by the operator with a variac.

Wafer anode handling may be performed by a different version of the machine's feed system. In wafer welding, the porous tantalum wafer is fed from a vibratory stainless steel bowl into a track, either tubular or rectangular, which deposits the wafer onto a turntable. In a geneva motion, the turntable moves through an arc to position at the welding station, where the wafer is firmly clamped.

The lead wire arrives at the welding position guided in a long curve from the horizontal into a position immediately above and perpendicular to the wafer. After the wire is clamped and cut off, the welding takes place and a pick-off arm removes the welded unit to a container.

Since contamination is a serious threat to the tantalum parts, the iron casting preferably is sealed and painted gloss white so any accumulation of dust or other contaminants inside the cabinet can be easily detected. Moreover, specially manufactured lubricants must be used to avoid the contamination to tantalum that can be caused by regular petroleum or organic lubricants.

Due to the nature of the porous tantalum anode, a barrier of tantalum oxide is formed over the surfaces thereof. The wire also has an oxide over it. The oxide forms a very high insulating barrier holding back arcing as the two pieces come together. Both parts are hot and, when the oxidation layers are penetrated and contact is made, the stored electrical energy is released and the two parts are heated (the wire more than the slug). The wire actually penetrates the slug.

Figure 4:
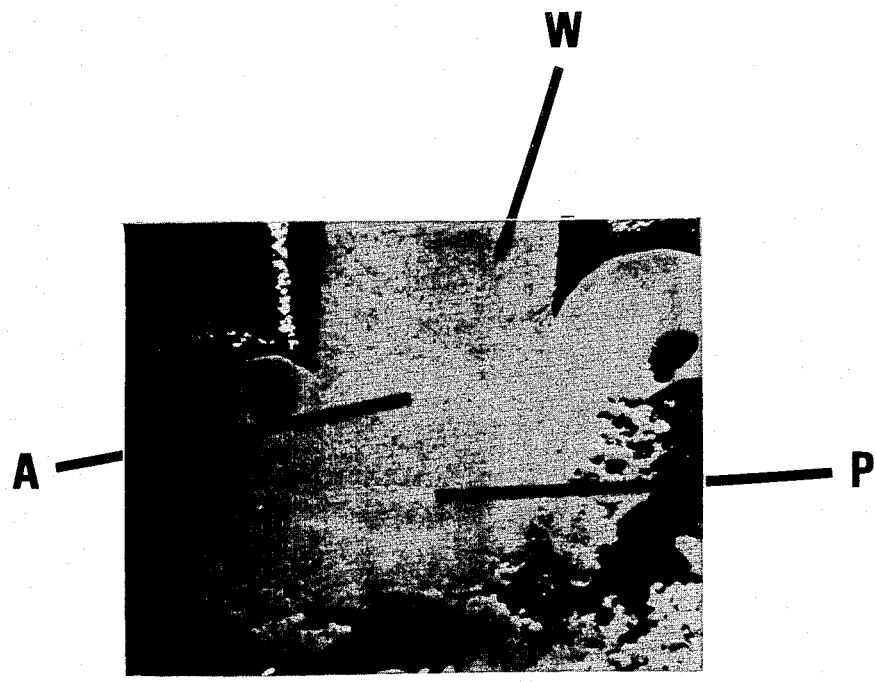

Referring now to FIG. 4, which is a photomicrograph of a section of a tantalum wire welded to a porous tantalum pellet, the wire W is shown to have actually penetrated the porous pellet P. The wire does not have the fillet or skirt surrounding it near the pellet surface which is characteristic of percussion (arc) welding. In fact, the surface of the pellet is drawn down along the wire. The fused area A forms a secure joint between the wire and pellet. The joint illustrated would pass the commonly accepted test for such welds, i.e., it would survive three complete right angle bends near the weld junction.

Having thus described the invention with the detail and particularity required by the Patent Laws, what is desired protected by Letters Patent is set forth in the following claims.

1. An apparatus for welding a wire to an item comprising means including a micrometer for selecting and cutting a length of wire, means for gripping the cut length of wire, means for holding the item, spring driven means for driving the end of the wire and a surface of the item together, an electrical circuit including the wire length and the item for releasing electrical energy, an adjustable voltage alternating current source,
rectifying means having a direct current output,
first means for coupling the adjustable alternating current source to the rectifying means including a switch,
means for storing electrical charge having a plurality of selectable capacitors,
second means for coupling the direct current output of the rectifying means to the means for storing electrical charge for increasing the energy stored in the said storing means,
third means for coupling one side of the storing means to either the wire or the item,
fourth means for coupling the other side of the storing means to the other of the wire or the item including a switch and a resistive element in series with the switch, switch activating means for causing the switch in the first coupling means to open and the switch in the fourth coupling means to close prior to the time the wire and the element are moved together, and said resistive element selected to minimize the intensity of the arc, if any, prior to contact and to provide an arc after contact which is maintained by melting back the tapered end of the wire.

* * * * *